United States Patent [19]

Conner, Jr.

[11] Patent Number: 4,837,575
[45] Date of Patent: Jun. 6, 1989

[54] IDENTIFICATION SYSTEM
[75] Inventor: Leo B. Conner, Jr., Phoenix, Ariz.
[73] Assignee: Motorola, Inc., Schaumburg, Ill.
[21] Appl. No.: 271,402
[22] Filed: Nov. 14, 1988

Related U.S. Application Data

[63] Continuation of Ser. No. 820,398, Nov. 4, 1985, abandoned.

[51] Int. Cl.[4] ............................................. G01S 13/80
[52] U.S. Cl. ...................................... 342/45; 342/54
[58] Field of Search .................................. 342/45, 54

[56] References Cited
U.S. PATENT DOCUMENTS

| | | | |
|---|---|---|---|
| 2,592,777 | 4/1952 | Williams | 342/45 |
| 3,667,054 | 5/1972 | Nelson | 342/45 X |
| 3,949,397 | 4/1976 | Wagner et al. | 342/45 |
| 4,074,263 | 2/1978 | Sullivan, Jr. | 342/45 |
| 4,075,631 | 2/1978 | Dumez | 342/45 |
| 4,144,534 | 3/1979 | Prickett et al. | 342/45 X |
| 4,194,201 | 3/1980 | Stein | 342/45 |
| 4,198,632 | 4/1980 | Bishop | 342/45 |
| 4,213,128 | 7/1980 | Longinotti | 342/45 X |
| 4,322,729 | 3/1982 | Honold et al. | 342/45 |

Primary Examiner—Thomas H. Tarcza
Assistant Examiner—John B. Sotomayor
Attorney, Agent, or Firm—Frank J. Bogacz

[57] ABSTRACT

A secure identification system for identifying a potential target in a battlefield environment as being either a friend or a foe is disclosed. An interrogator produces two interrogation pulses, such as laser flashes, aimed at the target and separated from each other by a randomly determined period of time. The target detects the two interrogation pulses, measures elapsed time between the two pulses, and prepares a reply signal for transmission which is controlled by the elapsed time. Frequency, pulse width, and transmission delay parameters are each controlled in a substantially random, but predetermined manner in response to the elapsed time. The interrogator has a receiver and qualifier which receive reply signals and define expected values for the controlled parameters. An indication is provided concerning whether the target represents a friend or a foe based on received reply signals at the interrogator.

20 Claims, 7 Drawing Sheets

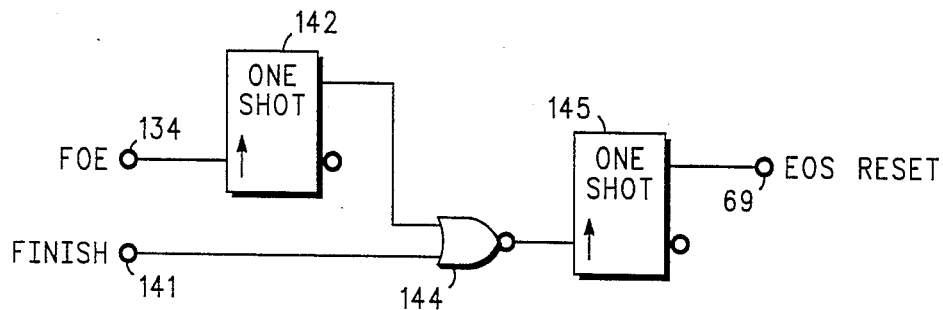
FIG. 8
FIG. 9
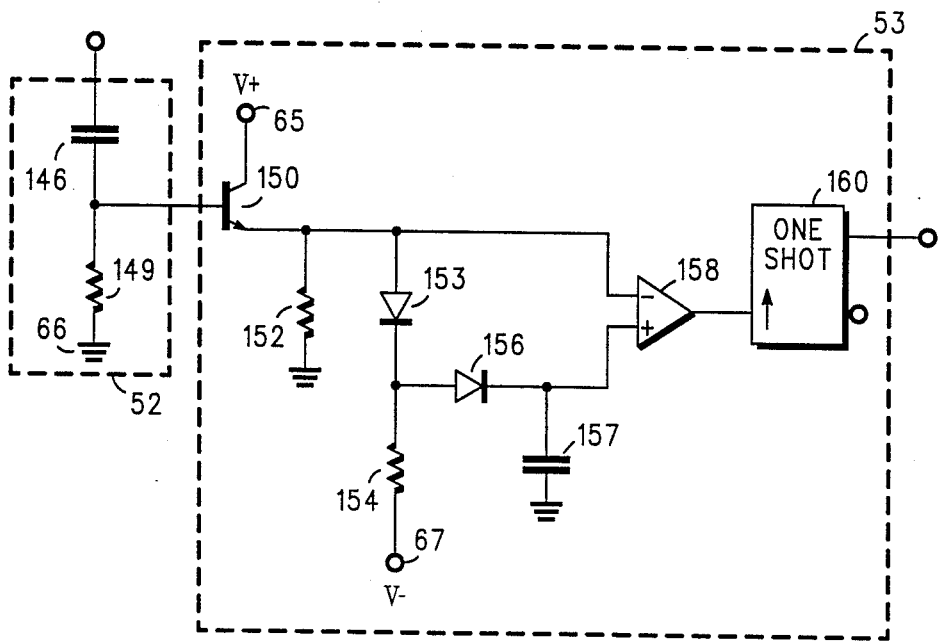

IDENTIFICATION SYSTEM

This application is a continuation of prior application Ser. No. 820,398, filed Nov. 4, 1985, now abandoned.

BACKGROUND OF THE INVENTION

This invention relates generally to identification systems. Specifically, the present invention concerns identification systems which are useful in a battlefield environment. In this environment, an interrogator, such as a first tank, may wish to examine a target, such as a second tank, to determine whether the target represents a friend or foe. More specifically, the present invention relates to identification systems which minimize the possibility of detecting the presence or location of either the interrogator or target by unfriendly forces. Further, the present invention relates to identification systems which remain operative and secure in spite of jamming or capture by unfriendly forces.

An identification system in a battlefield environment can help reduce fratricide among friendly forces. Additionally, an identification system can increase firing rates by reducing the time spent deciding whether a target represents a friend or foe. An identification system typically provides only an indication of whether a target represents a friend or a foe. Typically, no drastic action, such as fire a gun, is automatically taken upon the receipt of this indication. Rather, the final denison concerning whether to take some action typically remains with a human operator. Thus, an identification system which identifies an interrogator or target to an enemy, is inoperative, susceptible to jamming, overly complicated, or is exploitable upon capture by the enemy, may not be used. Such an identification system becomes useless in reducing fratricide or increasing battlefield firing rates.

Various identification systems have been proposed. However these identification system tend to suffer serious drawbacks. One identification system requires an interrogator to transmit a relatively low frequency, radio frequency (RF) signal to which a friendly target responds by transmitting another RF signal. But, such low frequency transmitted RF signals may be easily received by an enemy as well as friends. This system can potentially identify the interrogator and the interrogator's position to enemy forces who are capable of receiving the interrogator's transmitted RF signal.

In other identification systems, targets reply to an interrogation by transmitting relatively long, secret codes. But, such reply codes may be relatively easy to detect by an enemy and become susceptible to jamming. Additionally, if the codes are known in advance, an enemy may be able to exploit the identification system.

SUMMARY OF THE INVENTION

Accordingly, it is an object of the present invention to provide an improved identification system in which detection of an interrogator's interrogation by an enemy is extremely difficult.

Another object of the present invention concerns providing an identification system which reduces a possibility of detecting a friendly target's reply signal by an enemy.

Yet another object of the present invention concerns providing an identification system which reduces a possibility of the system's being exploited by an enemy in the event that the system becomes captured by the enemy.

Still another object of the present invention concerns providing an identification system which reduces a possibility of an enemy being able to successfully interrogate a friendly target.

Still another object of the present invention concerns providing an identification system which is relatively immune to jamming.

The above and other objects and advantages of the present invention are carried out in one form by a system in which an interrogator has an examination apparatus and a target has a reply apparatus. The examination apparatus includes a directional transmitter which is capable of providing two interrogation pulses. The reply apparatus includes a detector which detects the two interrogation pulses. A time measuring means in the reply apparatus measures an elapsed time between the two interrogation pulses. The reply apparatus additionally contains a radio frequency (RF) transmitter which transmits an RF signal. The RF signal exhibits a parameter with a value which is controlled in response to the elapsed time. The examination apparatus contains an RF receiver which receives the RF signal. A qualifier determines an expected value for the parameter controlled by the elapsed time, and an indicating means indicates whether the RF signal exhibited the expected parameter value.

BRIEF DESCRIPTION OF THE DRAWINGS

A more complete understanding of the present invention may be derived by reference to the detailed description and the claims when considered in connection with the accompanying drawings in which like reference numbers represent similar parts, and wherein:

FIG. 8 shows a block diagram of a reset section of the first embodiment of the present invention; and FIG. 9 shows a detailed diagram of a particular embodiment of a high pass filter and a pulse stretcher which are shown in FIG. 5.

DETAILED DESCRIPTION OF THE PREFERRED EMBODIMENT

Figure 1:
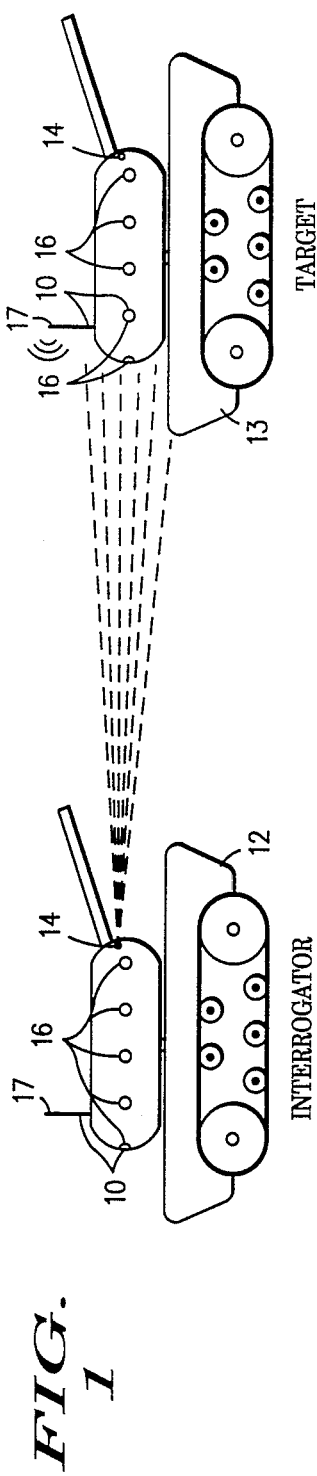
FIG. 1 depicts the basic operation and components of the present invention.

In a preferred embodiment of an identification system as illustrated in FIG. 1, two vehicles, shown as tanks, are involved in an identification process. Although both vehicles contain similar equipment, one of the vehicles, an interrogator 12, operates a first identification apparatus 10 in an interrogation mode while the other vehicle, a target 13, operates a second identification apparatus 10 in a reply mode. In the preferred embodiment, either of the vehicles may operate in either the interrogate or reply modes. Each of the vehicles contains a directional transmitter 14, a detector 16, and an antenna 17.

Figure 2:
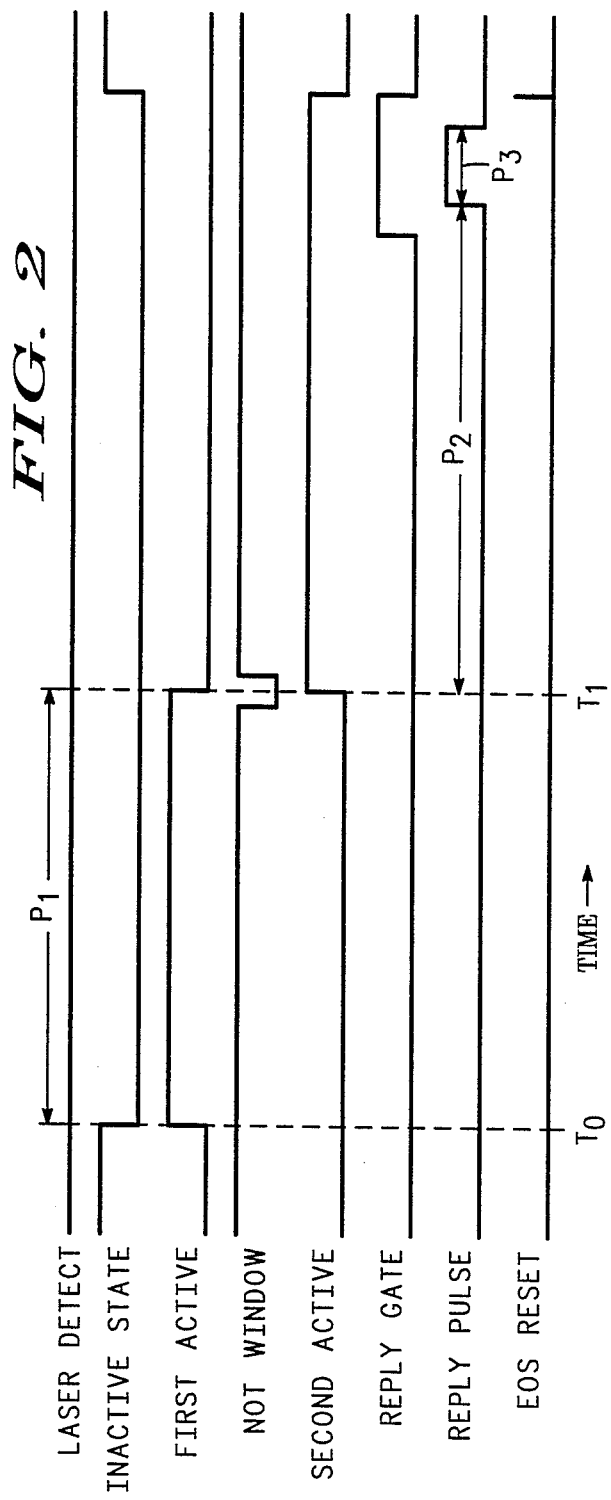
FIG. 2 shows a timing diagram of various representative signals used by the present invention.

FIG. 1 and the timing diagram shown in FIG. 2 describe the operation of identification apparatus 10. At an arbitrary point in time T0 (see FIG. 2) interrogator 12 triggers its directional transmitter 14, causing directional transmitter 14 of interrogator 12 to produce an interrogation pulse.

In a preferred embodiment of the present invention directional transmitter 14 represents a laser, and the interrogation pulse represents a laser flash. The laser flash represents a relatively directional and coherent beam of light compared to other types of light. Thus, the laser flash is confined to being aimed in a relatively precise direction toward target 13. Additionally, in this embodiment of the present invention, the laser flash transitions from an off state to an on state in a relatively short period of time and lasts for only a short duration. A one nanosecond transition time and an eight nanosecond flash duration characterize the laser flash contemplated herein.

Detector 16 of target 13 detects the interrogation pulse from interrogator 12. In the preferred embodiment detector 16 represents a laser detector which contains eight light sensitive diodes spaced evenly around the periphery of the vehicle. The diodes are aimed so that at least one of the diodes receives a laser flash regardless of the direction from which the laser flash may originate when target 13 is at least a predetermined minimum distance away from interrogator 12.

Although the preferred embodiment utilizes laser 14 and laser detector 16, the present invention is not limited in scope to the use of a laser as directional transmitter 14 and a laser detector as detector 16. Those skilled in the art will recognize that any highly directional RF transmitter may be used in place of laser 14, such as is achievable using directional antennas and RF frequencies in the KA band or higher. In many applications an interrogation pulse radiated from such a directional transmitter 14 may be sufficiently directional and coherent that an acceptably low probability of an enemy being able to detect the interrogation pulse exists. Likewise, laser detector 16 may be replaced with an RF antenna and receiver which cooperates with such a directional RF transmitter. Additionally, the RF antenna may advantageously be directionalized in a manner which corresponds to the diode arrangement mentioned above.

At a second arbitrary point in time $T_1$, directional transmitter 14 of interrogator 12 produces a second interrogation pulse which detector 16 of target 13 detects. Point in time $T_1$ is separated from point in time $T_0$ by an elapsed time period $P_1$. Elapsed time period $P_1$ represents a generally random interval. However, elapsed time period $P_1$ may be confined to being within a predetermined range, such as between 0.5 to 2.0 seconds. Additionally, point in time $T_1$ occurs within a predefined timing window, as shown in FIG. 2 by a trace labeled "Not-Window." This timing window may vary within the predetermined range in a substantially random, but predetermined manner. The precise position in time where $T_1$ occurs relative to the timing window is a random occurrence.

Both interrogator 12 and target 13 measure elapsed time period $P_1$. Target 13 transmits a radio frequency (RF) reply pulse signal at antenna 17 of target 13 when it verifies that the second interrogation pulse occurred within the timing window. This RF reply pulse signal is programmed to exhibit parameters whose values vary in response to elapsed time period $P_1$. A transmission delay period $P_2$, and a pulse width $P_3$, shown in a FIG. 2 trace labeled "Reply Pulse" represent two of the parameters. Transmission delay $P_2$ represents the time which occurs between the second interrogation pulse and the beginning of the transmitted RF reply pulse. Pulse width $P_3$ represents the duration of the transmitted RF reply pulse. Additionally, a frequency parameter of the transmitted RF reply pulse signal may be controlled by elapsed time $P_1$. A scrambled or substantially random, but predetermined, relationship between the elapsed time and the values of the controlled frequency, delay period, and pulse width parameters may be used so that an enemy cannot predict the target's reply message should an enemy detect elapsed time period $P_1$.

Antenna 17 of interrogator 12 receives the transmitted RF reply pulse signal. Since interrogator 12 also measures elapsed time $P_1$, and since values for the controlled parameters of the transmitted RF signal vary in a predetermined manner, interrogator 12 can specify expected values for the controlled parameter. Thus, interrogator 12 checks the reply signal received at antenna 17 of interrogator 12 to verify that expected parameter values characterize the received signal. Interrogator 12 then provides an indication, which is perceptible by human beings, of the results of the check. In the present embodiment all of the expected parameter values must be exhibited by a signal received at antenna 17 of interrogator 12 in order to indicate that the target represents a friend. Elsewise, an indication identifies the target as a foe.

Thus, the present invention uses a directional transmitter to interrogate a target. The directional transmitter emits a relatively coherent beam of energy which is difficult to detect by enemy forces unless the enemy forces are directly illuminated by the energy or detect a reflection. Accordingly, as long as the target is not an enemy, the use of such a directional transmitter makes detection of an interrogation by an enemy extremely difficult.

The reply signal transmitted by target 13 may advantageously represent a relatively low power signal. Additionally, this signal in the present embodiment represents a low duty cycle, frequency agile signal. These factors combine to make detection of the transmitted RF reply pulse signal difficult.

The present invention may be practiced using many different frequency bands for the reply signal. However, a frequency band may be selected which is high enough to permit use of a small, directional antenna. In this situation, such an antenna may advantageously be aimed along the direction in which directional transmitter 14 aims to further reduce power requirements of the transmitted RF reply signal and the likelihood of detecting the reply signal by an enemy.

To even further reduce the power level of this signal, and therefore further reduce the likelihood of detection of the signal by an enemy, a narrow bandwidth receiver may also be used in interrogator 12. The narrow bandwidth need receive only a unique frequency, and deviations due to doppler shift and oscillator instability. Additionally, a frequency band which is used for friendly jamming or communications may be used by the reply signal of the present invention. The narrow bandwidth receiver could properly operate in spite of such jamming, and detection of the target's reply signal by an enemy becomes even more difficult.

Figure 3:
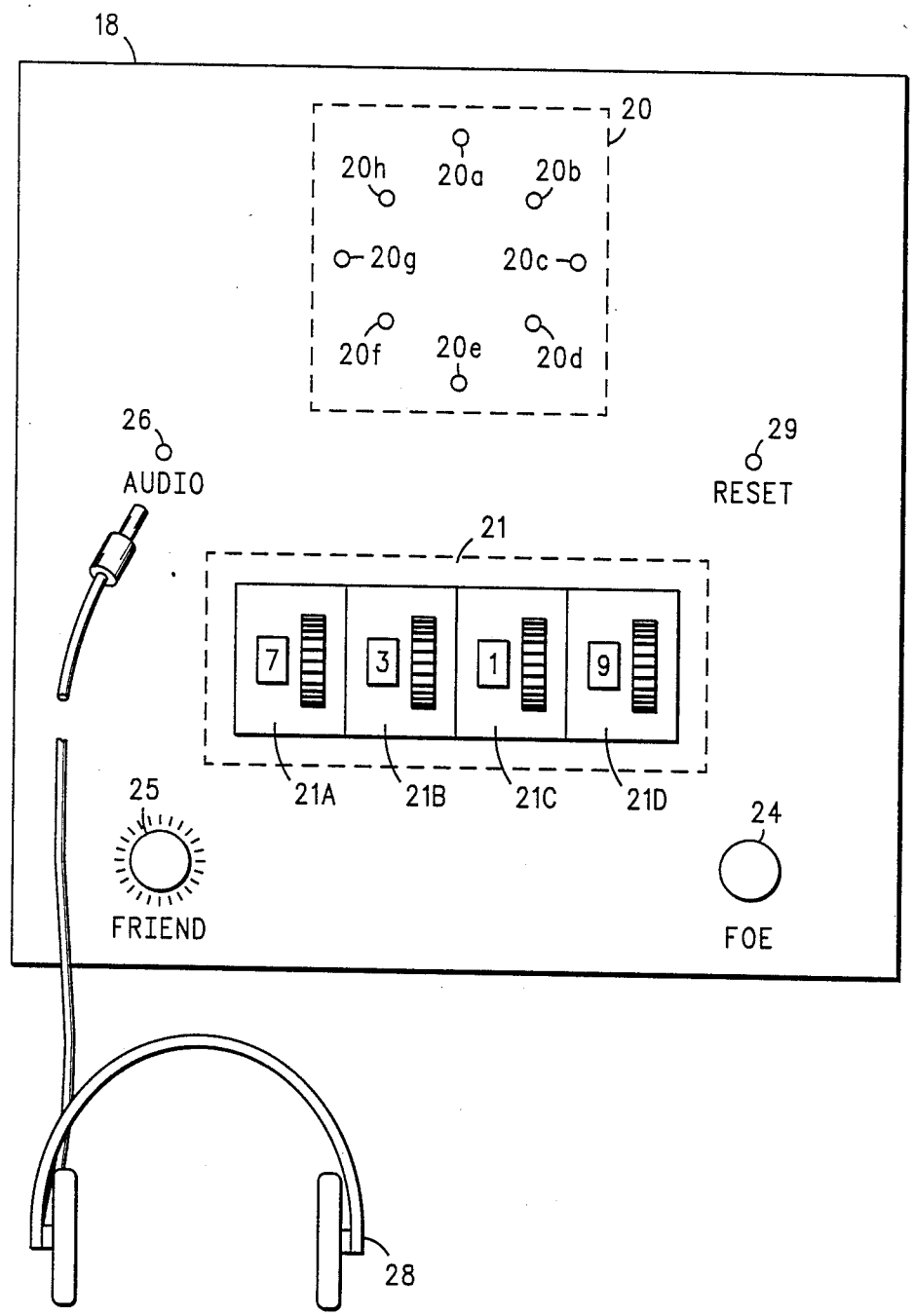
FIG. 3 shows a control panel which may be used with the present invention.

Referring to FIG. 3, a control panel is shown which may be used to interface a human operator to the present invention. Control panel 18 contains an interrogation indicator 20 which communicates to the operator the fact that an interrogation pulse has been detected by detector 16 (see FIG. 1).

Interrogation indicator 20 additionally provides information concerning the direction from which the interrogation pulse originates. In the preferred embodiment, which uses light sensitive diodes for detector 16, interrogation indicator 20 contains lamps 20a, 20b, 20c–20d, 20e, 20f, 20g, and 20h arranged in a circle. Each of lamps 20a–20h couples to one of the diodes which are used by detector 16 (see FIG. 1). When a laser detector diode 16 detects a laser flash, a corresponding one of interrogation indicator lamps 20a–20h illuminates. Thus, interrogation indicator 20 provides an indication in a humanly perceptible form when detector 16 detects the occurrence of a laser flash.

The arrangement of lamps 20a–20h permits the communication of information concerning a direction of an interrogation. In the preferred embodiment, lamp 20a responds to the laser detector diode 16 which detects laser flashes originating from a predetermined direction. If identification system 10 resides in a tank, then this predetermined direction may advantageously represent the azimuth of the main gun. Lamp 20b indicates the detection of laser flashes originating from a direction displaced approximately 45° in a clockwise rotation from the direction represented by lamp 20a. Similarly, lamps 20c–20d, 23e, 20f, 20g, and 20h, indicate the detection of laser flashes originating from directions approximately 90, 135, 180, 225, 270, and 315 degrees, respectively, in a clockwise rotation from the direction represented by lamp 20a. An operator can know from which direction an interrogation originates by observing which one of interrogation lamps 20a–20h is illuminated.

An interrogation may not originate from precisely one of the directions represented by lamps 20a–20h. Nevertheless, when identification system 10 is at least the minimum predetermined distance away from the interrogator mentioned above, at least one of lamps 20a–20h will illuminate. When only one lamp illuminates, it indicates the approximate direction from which the interrogation originated. When two or more of lamps 20a–20h illuminate, an approximate direction is indicated by an average of the directions indicated by the lamps individually. For example, if lamps 20a and 20b both are illuminated, then a direction which is the average of 0°, the direction represented by lamp 20a, and 45°, the direction represented by lamp 20b, or an approximate direction of 22.5° indicated.

Interrogation pulses which originate from one identification apparatus 10 can be so identified by other ones of identification apparatus 10. Interrogator 12, which contains a first identification apparatus 10 operating in an interrogation mode (see FIG. 1) triggers a second interrogation pulse only during a timing window, (Not Window) period, as discussed above. This timing window (Not Window in FIG. 2) occurs only during a relatively small period of time within the larger timing range. Further, this timing window moves in time in a substantially random, but predetermined manner. Since a timing window's precise location within the timing range is predetermined, target 13, which contains a second identification apparatus 10 operating in a reply mode (see FIG. 1), predicts when the timing window occurs. Thus, target 13 recognizes whether the second interrogation pulse occurred within the timing window. If the second interrogation pulse occurred during the timing window, then a friend lamp 25 on control panel 18 of target 13 illuminates indicating in a form perceptible by human beings that the interrogation pulse originated from a friend. However, if the second interrogation pulse did not occur, or occurred at a time other than during the timing window, then a foe lamp 24 on control panel 18 illuminates, instead of friend lamp 25, indicating that the interrogation pulse may have originated from an enemy.

Interrogator 12 illuminates one of lamps 24 or 25 to indicate the outcome of an interrogation. Thus, if a reply RF pulse signal received at interrogator 12 exhibits the expected parameters as discussed above in connection with FIGS. 1 and 2, then friend lamp 25 illuminates. However, if the reply signal is not received, or fails to exhibit expected parameter values, then foe lamp 24 illuminates instead of friend lamp 25.

In one embodiment of the present invention interrogator 12 may provide a humanly perceptible indication of the outcome of an interrogation through an audio output 26 of control panel 18. Headset 28 couples to audio output 26 and communicates the audio signal to an operator of identification apparatus 10.

Providing an audio signal as an indicator of the outcome of an interrogation permits the operator's human brain to process the reply signal. The human brain is excellent at discriminating a particular signal in the presence of noise when compared with electrical discriminating systems. Thus, the use of an audio signal indicator permits the use of a lower power level reply RF pulse signal by target 13 because the operator can successfully detect the reply signal regardless of a lower reply signal power level relative to noise. Accordingly, the lower power level of the reply signal reduces the possibility of target 13 being detected by an enemy.

To convert the reply signal into an audio signal, interrogator 12 down-converts a received reply signal to a frequency in the audio range. The operator knows whether a target represents a friend or a foe by listening for the audio range signal, or tone. A proper frequency and timing relationship of the reply signal is discerned by the operator because interrogator 12 plays a well known tune. The reply signal is converted to supply a single key note which interrogator 12 omits from the tune. If the key note is present at the expected location in the tune, and has the expected pitch and duration, then the operator may conclude that the target represents a friend. However, if the key note is missing, or exhibits an unexpected location, pitch, or duration, operator may suspect that the target represents an enemy.

Control panel 18 contains code switches 21. Code switches 21 control the particular manner in which parameter values for the interrogation pulses from interrogator 12 and the reply signal of target 13 change or respond to elapsed time. As discussed above, the timing window period within which the second interrogation pulse from interrogator 12 occurs changes in a substantially random, but predetermined manner. Additionally, the transmission delay, pulse width, and frequency parameters of the reply signal from target 13 respond to the elapsed time between two detected interrogation pulses in substantially random but predetermined ways.

The preferred embodiment stores a multiplicity of random number tables in memory elements (discussed below). Identification apparatus 10 utilizes the random number tables to generate these random responses. Since the random number tables are stored in memory elements, the random responses are predetermined. Further, all of identification apparatuses 10 which communicate with each other contain the same random number tables so that the random responses are predetermined in a manner known to both interrogator 12 and target 13.

In the preferred embodiment code switch 21a controls timing windows. Switch 21a provides ten different settings. Each of the ten different settings specifies a unique one of ten different random number tables. Thus, the location in time of the timing window varies in a particular one of ten different random patterns depending upon the setting of switch 21a. Similarly, code switches 21b, 21c, and 21d control frequency, pulse width, and transmission delay, respectively, of the reply signal. Each of code switches 21b, 21c, and 21d provide ten different settings, and each of the ten different settings of each code switch specifies a unique random number table.

As a consequence of identification apparatus 10 including code switches 21 and the random number tables, all of identification apparatuses 10 which successfully communicate with each other use the same, or related, code switch settings so that corresponding random number tables are specified between interrogator 12 and target 13. If an enemy captures an identification apparatus 10, friendly forces change their code switch setting. Since four switches are used, and since each switch has ten switch settings, an enemy faces only one chance in ten thousand that a particular setting will permit his captured identification apparatus 10 to operate successfully with the remaining uncaptured identification apparatuses 10. Thus, it is unlikely that an enemy will be able to exploit identification system 10 upon its capture.

Control panel 18 additionally contains a manual reset switch 29. An operator of identification system 10 activates manual reset switch 29 to turn off any lamps which may be illuminated. Thus, interrogation indicator lamps 20, friend lamp 25, and foe lamp 24 remain illuminated until noticed by the operator and turned off through the use of manual reset switch 29.

Figure 4:
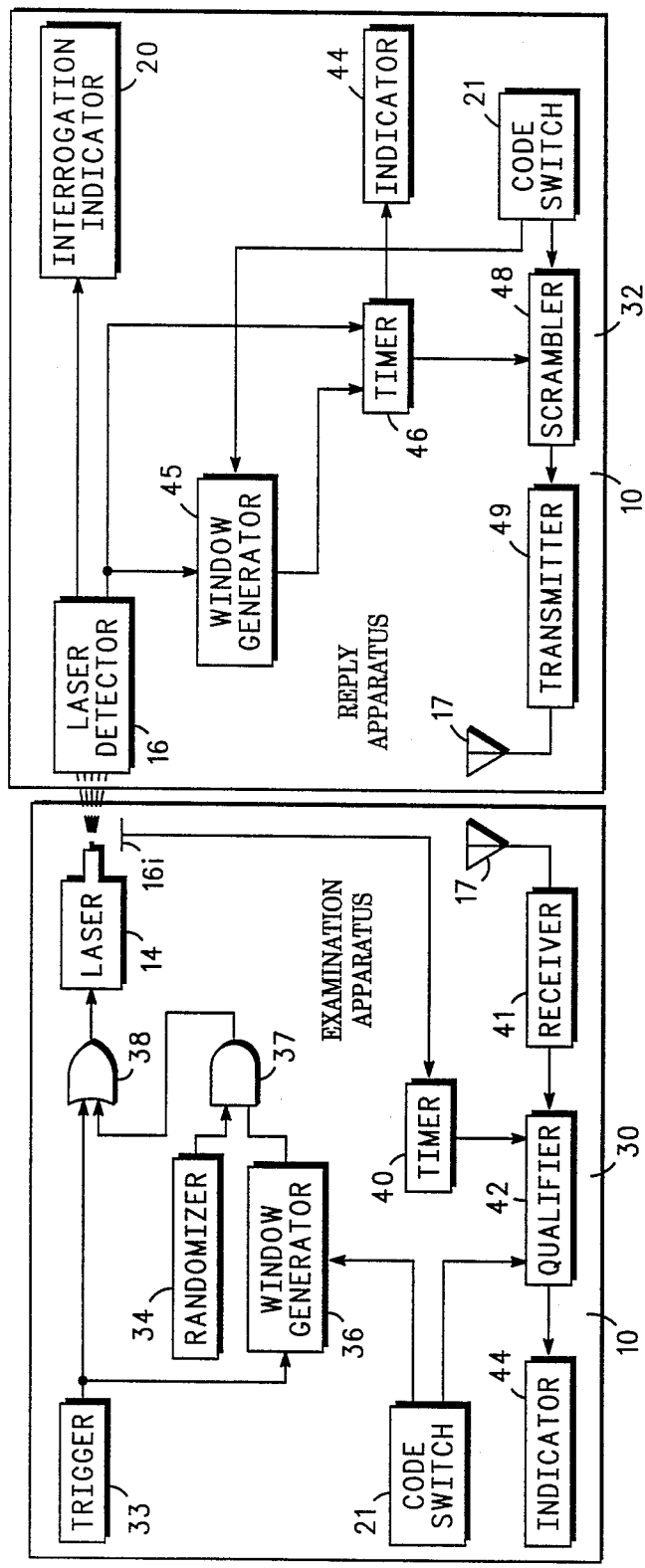
FIG. 4 shows a simplified block diagram of the present invention.

FIG. 4 shows a simplified block diagram of the preferred embodiment of an identification system 11. Identification system 11 includes an examination apparatus 30 located within interrogator 12 (see FIG. 1). Examination apparatus 30 may represent an identification apparatus 10 operating in an interrogation mode. Identification system 11 additionally includes a reply apparatus 32 located within target 13 (see FIG. 1). Reply apparatus 32 may represent an identification apparatus 10 operating in a reply mode.

Examination apparatus 30 uses laser 14 as a directional transmitter. Thus, it contains a trigger 33 which an operator of identification apparatus 10 uses to cause laser 14 to produce a laser flash. A trigger output from trigger 33 couples to a first input of an OR gate 38 and an input of a window generator 36. Outputs from a randomizer 34 and window generator 36 couple to separate inputs of an AND gate 37. An output of AND gate 37 couples to a second input of OR gate 38, and an output of OR gate 38 couples to an input of laser 14.

Laser 14 produces an optical output. This output optically couples to a laser detector diode 16i of examination apparatus 30. Although a highly coherent beam of light is produced by laser 14, diode 16i need not be placed directly in the path of the laser beam. Diode 16i may be located physically close to laser 14. If laser 14 is located so that the laser flash must pass through glass, or other substantially transparent substance, then diode 16i may be located on the transverse side of the transparent substance from laser 14. Sufficient diffusion results from imperfectly smooth substance surfaces and substance impurities to couple a portion of laser light into diode 16i.

Diode 16i electrically couples to an input of a timer 40. An output from timer 40 couples to a first input of a qualifier 42. Antenna 17 of examination apparatus 30 couples to an input of a receiver 41, and an output of receiver 41 couples to a second input of qualifier 42.

Code switch 21 of examination apparatus 30 specifies particular random number tables for use within window generator 36 and qualifier 42. Thus, code switch 21 of examination apparatus 30 has a first output which couples to an input of window generator 36 and a second output which couples to a third input of qualifier 42. An output of qualifier 42 couples to an input of an indicator 44.

Reply apparatus 32 contains laser detector 16 which detects the occurrence of laser flashes, such as from laser 14 of examination apparatus 30. A first output of laser detector 16 couples to an input of interrogation indicator 20. As discussed above, interrogation indicator 20 provides a humanly perceptible indication of the detection of a laser flash and of the direction from which a detected laser flash originates.

A second output from laser detector 16 couples to inputs of a window generator 45 and a timer 46. Code switch 21 of reply apparatus 32 specifies particular random number tables and has a first output which couples to an input of window generator 45. An output of window generator 45 couples to an input of timer 46.

A first output from timer 46 couples to a first input of a scrambler 48, and a second output of code switch 21 of reply apparatus 32 couples to a second input of scrambler 48. A second output of timer 46 couples to an input of indicator 44 of reply apparatus 32. An output from scrambler 48 couples to an input of a transmitter 49, and an output from transmitter 49 couples to antenna 17 of reply apparatus 32.

In order for identification system 11 to undergo an identification process, an operator of examination apparatus 30 aims laser 14 of examination apparatus 30 at target 13 (see FIG. 1). Target 13 may or may not contain a reply apparatus 32. Next the operator pulls, or activates, trigger 33, so that an electrical pulse is routed through OR gate 38 to laser 14 causing laser 14 to produce a first laser flash. Laser detector diode 16i detects the first laser flash and activates timer 40. When activated, timer 40 counts, or measures time, until deactivated.

The electrical pulse generated by pulling trigger 33 also activates window generator 36. Window generator 36 represents a counter, or timer, which counts, or times, only for a preset amount, then produces a pulse the width of the timing window described above and shown in the trace labeled "Not-Window" in FIG. 2. A representative value for the timing window may advantageously be 10 msec. This preset amount is particular position in a sequence defined by a random number table contained within window generator 36.

Randomizer 34 represents a pulse generator that generates pulses at a rate slightly greater than: 1/timing window period. If a 10 msec timing window is utilized, then a 105 pulses per second rate is representative. This rate ensures that one pulse will be generated during the timing window. When the one pulse occurs from randomizer 34, it is passed through AND gate 37 and OR gate 38 to automatically cause laser 14 to produce a second laser flash.

Thus, a second laser flash is produced with a random timing characteristic within the timing window and relative to the occurrence of the first laser flash. The randomness occurs because a human operator causes the first pulse, and a constant frequency pulse generator within randomizer 34 causes the second pulse. The operator actions are not synchronized to the pulse generator, hence the time interval between the two laser flashes is substantially random.

Diode 16i detects the second laser flash and causes timer 40 to deactivate. The deactivation of timer 40 freezes a count which represents the elapsed time between the first and second laser flashes.

Referring to reply apparatus 32 in FIG. 4, laser detector 16 detects both laser flashes. A signal provided to interrogation indicator 20 causes one or more of lamps 20a-20h to illuminate (see FIG. 3). Window generator 45 responds to code switch 21 of reply apparatus 32 and to pulses from laser detector 16 similarly to that described above for window generator 36 of examination apparatus 30. Likewise, timer 46 activates upon the receipt of a first detection pulse from laser detector 16 and deactivates upon the receipt of a second pulse similar to timer 40 of examination apparatus 30. If the second pulse from laser detector 16 fails to occur during a timing window pulse generated by window generator 45, then timer 46 prevents the transmission of a reply signal, and causes indicator 44 of reply apparatus 32 to illuminate foe light 24 (see FIG. 3).

If the second laser flash occurred during the active state of the timing window generated by window generator 45, then the output of timer 46 represents a count which corresponds to elapsed time between the first and second laser flashes. Scrambler 48, in response to the elapsed time provided by timer 46 and switch settings provided by code switch 21 of reply apparatus 32, provides predetermined random numbers which control the frequency, transmission delay, and pulse width of a reply signal transmitted through transmitter 49 and antenna 17 of reply apparatus 32.

Referring back to examination apparatus 30 in FIG. 4, qualifier 42 operates in a complementary fashion to scrambler 48. Qualifier 42 receives a signal from receiver 41 and antenna 17 of examination apparatus 30. Qualifier 42 contains random number tables similar to those contained in scrambler 48 of reply apparatus 32. Thus, switch settings from code switch 21 of examination apparatus 30 and elapsed time information from timer 40 permit qualifier 42 to provide predetermined random numbers which relate to the predetermined random numbers provided by scrambler 48 of reply apparatus 32. These random numbers are used in qualifier 42 to qualify, or unscramble, the signal received at antenna 17 of examination apparatus 30. Thus, qualifier 42 compares values of frequency, transmission delay, and pulse width parameters of the received signal against expected values Indicator 44 receives the results of the qualification from qualifier 42 and provides a humanly perceptible indication, such as illumination of friend lamp 25 or foe lamp 24 (see FIG. 3) and the generation of a tone.

FIGS. 5-8 show detailed block diagrams of the preferred embodiment of identification apparatus 10. The embodiment of identification apparatus 10 shown in FIGS. 5-8 operates in either an interrogation mode or a reply mode. While operating in the interrogation mode it represents examination apparatus 30 as shown in FIG. 4, but it represents reply apparatus 32, as shown in FIG. 4 when it operates in the reply mode.

Figure 5:
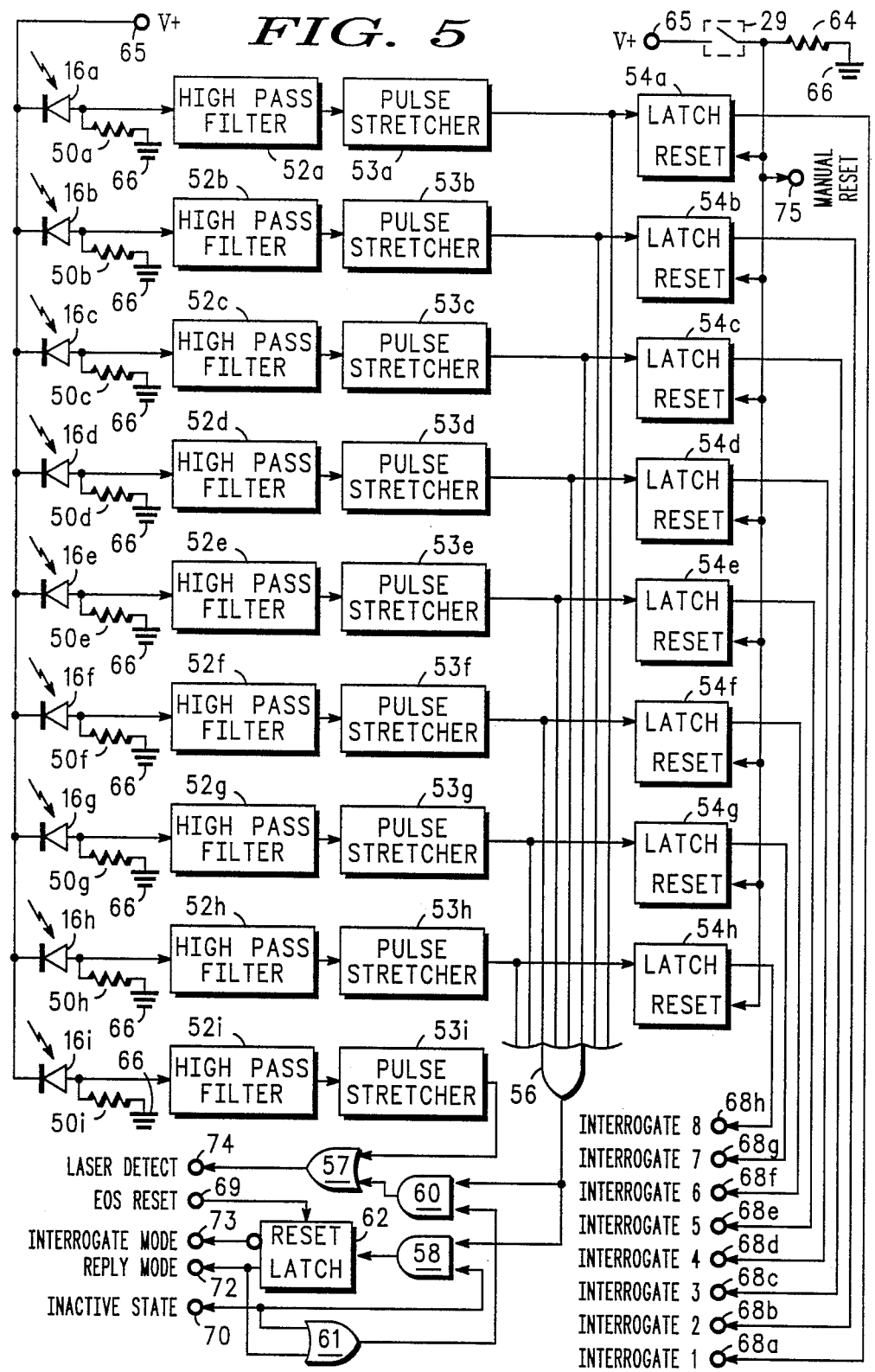
FIG. 5 shows a block diagram of a detector section of a first embodiment of the present invention.

In a laser detection section of identification apparatus 10, as shown in FIG. 5, photosensitive diodes 16a, 16b, 16c, 16d, 16e, 16f, 16g, 16h, and 16i each have a cathode which connects to the cathodes of all other diodes 16a-16i and to a terminal 65 adapted to receive a positive potential relative to a potential applied at a ground terminal 66. Diode 16a has an anode connected to a first node of a resistor 50a and to an input of a high pass filter 52a. In a similar manner, diodes 16b-16i have anodes which connect to unique first nodes of resistors 50b, 50c, 50d, 50e, 50f, 50g, 50h, and 50i, respectively. Second nodes of resistors 50a-50i connect to ground terminal 66.

An output of high pass filter 52a connects to an input of pulse stretcher 53a. Similarly, unique outputs of high pass filters 52b-52i connect to unique inputs of pulse stretchers 153b, 53c, 53d, 53e, 53f, 53g, 53h, and 53i, respectively. An output from pulse stretcher 53a connects to an input of a latch 54a and to a first input of an eight input logical OR device, such as OR gate 56. Likewise, unique outputs of pulse stretchers 53b-53h connect to unique inputs of latches 54b, 54c, 54d, 54e, 54f, 54g, and 54h, respectively, and to second through eighth inputs of OR gate 56, respectively. An output from pulse stretcher 53i connects only to a first input of OR gate 57. An output of latch 54a connects to a terminal 68a labeled "Interrogate 1." Similarly, unique outputs of latches 54b-54h connect to unique terminals 68b, 68c, 68d, 68e, 68f, 468g, and 68h, respectively, labeled "Interrogate 2," "Interrogate 3," "Interrogate 4," "Interrogate 5," "Interrogate 6," Interrogate 7,"and "Interrogate 8," respectively. Reset inputs of latches 54a-54h connect together, to a first node of a resistor 64, a first node of manual reset switch 29, and a terminal 75 labeled "Manual Reset." A second node of resistor 64 connects to ground terminal 66, and a second node of switch 29 connects to positive potential terminal 65.

An output of OR gate 56 connects to first inputs of AND gates 58 and 60. An output of AND gate 58 connects to an input of latch 62, and an output of AND gate 60 connects to a second input of OR gate 57. An output of OR gate 57 connects to a terminal 74 labeled "Laser Detect."

A non-inverting output of latch 62 connects to a first input of an OR gate 61 and to a terminal 72 labeled "Reply Mode." An inverting output of latch 62 connects to a terminal 73 labeled "Interrogate Mode." A terminal 69 labeled "EOS Reset" connects to a reset input of latch 62. A terminal 70 labeled "Inactive State" connects to second inputs of OR gate 61 and AND gate 58. An output of OR gate 61 connects to a second input of AND gate 60.

Photosensitive diodes 16a-16h reside around the periphery of a vehicle in which identification apparatus 10 resides, as discussed above in connection with FIG. 1. On the other hand, diode 16i resides near a vehicle's own laser 14 as discussed above in connection with FIG. 4. Diodes 16a–16i are responsive to the color of light produced by laser 14 (see FIGS. 1 and 4) and to the relatively fast rise times and short pulse widths exhibited by laser flashes.

When diodes 16 detect a laser flash, a pulse is produced which passes through high pass filters 52 and is captured in pulse stretchers 53. High pass filters 52 utilize the fast rise time characteristic of a laser flash to pass the laser flash while blocking passage of naturally occurring sources of light flashes. Pulse stretchers 53 convert the relatively short duration laser flash into longer duration pulses, which standard electronic circuits known to those skilled in the art of electrical circuit design readily accept. A particular embodiment of a high pass filter 52 and a pulse stretcher 53 suitable for use herein is described below in connection with FIG. 9.

Data related to the occurrence of laser flashes and converted to electrical pulses within pulse stretchers 53a–53h are stored in latches 54a–54h, respectively. The outputs of latches 54a–54h are routed to lamps 20a–20h, respectively, of As discussed above, a interrogation indicator 20 (see FIG. 3). lamp 20 remains illuminated or flashes until the activation manual reset switch 29. Thus, the activation of switch 29 causes the resetting of latches 54a–54h.

This embodiment of the present invention operates in an inactive state prior to the detection of a laser flash, as shown in the traces labeled "Inactive State" and "Laser Detect" of FIG. 2. While identification apparatus 10 operates in the inactive state, any laser flash detected at diodes 16a–16h produces a signal which passes through OR gate 56, and AND gate 58 to set latch 62, wherein latch 62 stores data signifying that identification apparatus 10 will operate in a reply mode. Additionally, the signal passes through AND gate 60 and OR gate 57 to provide a pulse signifying the detection of a laser flash. On the other hand, if diode 16i detects a laser flash while identification apparatus 10 operates in the inactive state, then a signal will pass through OR gate 57 to indicate the detection of a laser flash, and latch 62 will remain reset to signify that identification apparatus 10 will operate in an interrogation mode.

OR gate 61, along with AND gates 58 and 60, prevent the mode signal stored in latch 62 from changing while identification apparatus 10 operates in an active state. Thus, it blocks unwanted "Laser Detect" pulses from diodes 16a–16h while operating in the interrogation mode. The "EOS Reset" signal, as shown in a FIG. 2 trace labeled "EOS Reset," resets latch 62 after the completion of all reply or interrogation sequences.

Figure 6:
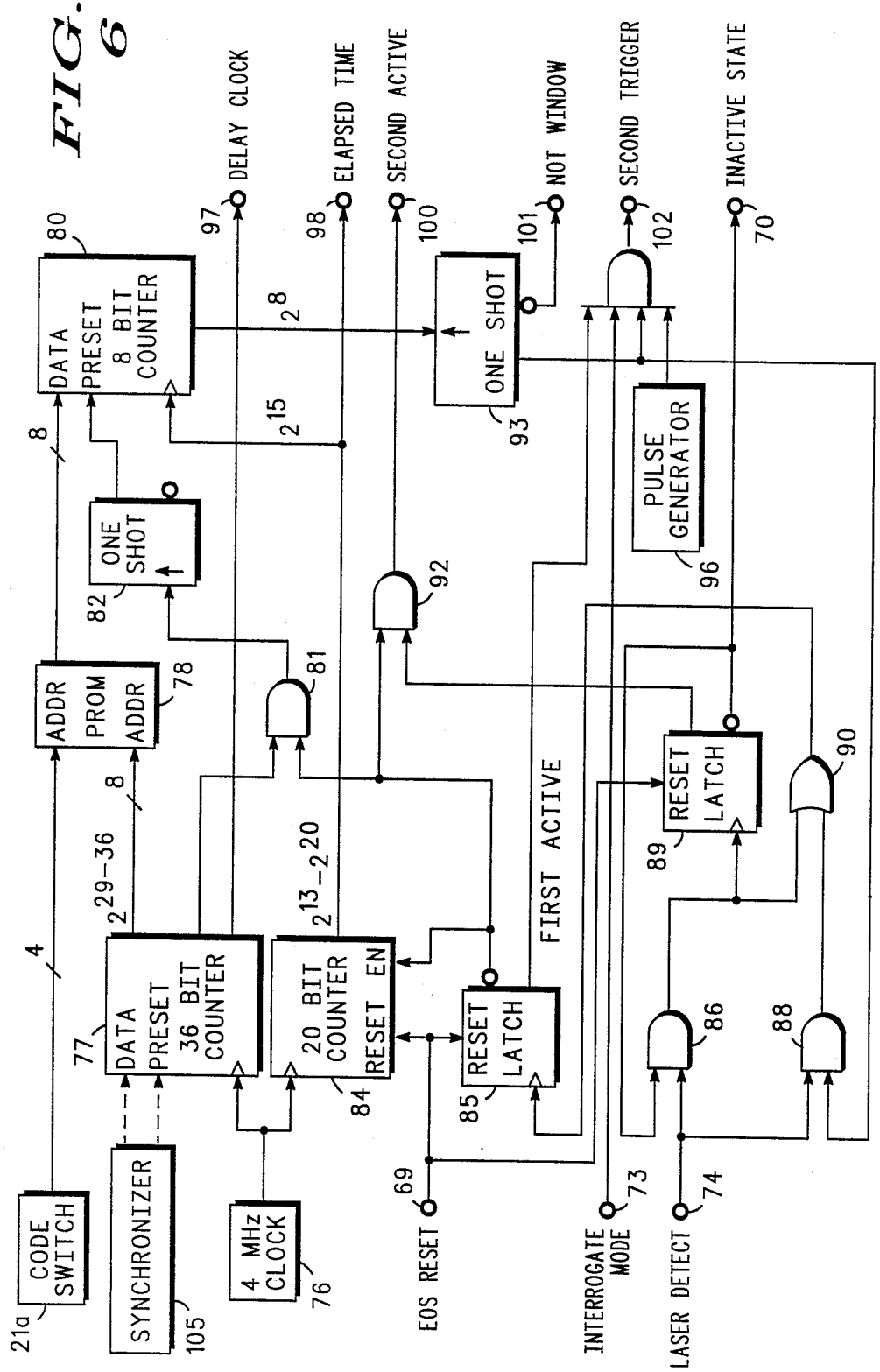
FIG. 6 shows a block diagram of a timing and control section of the first embodiment of the present invention.

In FIG. 6, which shows a timing and control section of the preferred embodiment of the present invention, code switch 21a has a four bit output which connects to a first portion of address inputs of a programmable read only memory (PROM) 78. A clock, preferably operating at 4 MHz and exhibiting an accuracy of at least 0.1 parts per million, has an output which connects to clock inputs of a 36 bit, free-running counter 77 and a 20 bit counter 84. Eight most significant output bits of counter 77 connect to a second portion of address inputs of PROM 78, a first lesser significant bit output of counter 77 connects to a first input of an AND gate 81, and a second lesser significant bit output of counter 77 connects to a terminal 97, labeled "Delay Clock."

PROM 78 has an eight bit output which connects to a data input of an eight bit counter 80. An output of AND gate 81 connects to a rising-edge trigger input of a monostable multivibrator (one shot) 82, and a non-inverting output of one shot 82 connects to a preset input of counter 80. Bits 13 through 20 output from counter 84 connect to a terminal 98, labeled "Elapsed Time," and bit 15 output from counter 84 connects to a clock input of counter 80. A bit-eight output from counter 80 connects to a rising-edge trigger input of a one shot 93, and an inverting output of one shot 93 connects to a terminal 101, labeled "Not Window." A non-inverting output of one shot 93 connects to a first input of a four input AND gate 94 and a first input of an AND gate 88.

Terminal 74, labeled "Laser Detect," connects to a second input of AND gate 88 and a first input of AND gate 86. An output of AND gate 86 connects to a clock input of a latch 89 and a first input of an OR gate 90. An output of AND gate 88 connects to a second input of OR gate 90, and an output of OR gate 90 connects to a clock input of latch 85.

Terminal 69, labeled "EOS Reset," connects to reset inputs of counter 84, latch 85, and latch 89. An inverting output of latch 89 connects to a second input of AND gate 86 and to terminal 70, labeled "Inactive State." A non-inverting output of latch 89 connects to a first input of an AND gate 92, and an inverting output from latch 85 connects to an enable input of counter 84, a second input of AND gate 81, and a second input of AND gate 92. An output of AND gate 92 connects to a terminal 100, labeled "Second Active."

Terminal 73, labeled "Interrogate Mode," connects to a second input of AND gate 94. A non-inverting output of latch 85 connects to a third input of AND gate 94. Additionally, a pulse generator 96 has an output which connects to a fourth input of AND gate 94. An output of AND gate 94 connects to a terminal 102 labeled "Second Trigger."

A synchronizer 105 occasionally couples to data and preset inputs of counter 77. Synchronizer 77 represents a master clock which, when coupled to counter 77, presets counter 77 to a standard count. Synchronizer 77 may occasionally couple to each counter 77 from many different identification apparatuses 10 so that the counters 77 are synchronized together. Counters 77 represent free-running counters. Thus, the digital counts output from counters 77 of different identification apparatuses 10 all describe substantially similar numbers at any particular point in time.

The digital count output from counter 77, and a switch setting provided from code switch 21a, specify an address for PROM 78. PROM 78 stores random number tables which define points in time for the occurrence of the timing window, described above in connection with the FIG. 2 trace labeled "Not Window." When clock 76 provides a 4 MHz signal and counter 77 represents a 36 bit counter whose 8 most significant bits provide address inputs for PROM 78, this timing window occurrence changes every 67 seconds in a random, but predetermined manner.

When identification apparatus 10 operates in the inactive state, a specified random number is loaded into counter 80 as a preset value under control of a signal output from counter 77, and passed through AND gate 81, and one shot 82. One shot 82 produces a pulse of sufficient duration to operate the preset input of counter 80. However, when operating in the not receive clock pulses and inactive state, counter 80 does therefore does not operate as a counter.

When identification apparatus 10 operates in the inactive state, counter 84, and latches 85 and 89 are reset because they have previously received an "EOS Reset" pulse. Accordingly, the "Inactive State" signal output from the inverting output of latch 89 exhibits a high level, as shown in FIG. 2. The receipt of a first "Laser Detect" pulse, described above in connection with FIG. 5 and shown in FIG. 2, causes identification apparatus 10 to enter an active state by toggling, or setting, latch 89. At the same time, latch 85 toggles, or is set.

Once identification apparatus 10 enters the active state, the following occur regardless of whether apparatus 10 operates in a reply or interrogation mode. AND gate 86 prevents future "Laser Detect" pulses from altering the active state indicated by latch 89. Counter 84 becomes enabled and begins counting the clock signal produced by master clock 76. AND gate 81 prevents one shot 82 from updating preset random numbers from PROM 78 into counter 80. Additionally, counter 80 receives clock pulses and counts, starting at the last loaded preset random number. This condition continues throughout a "First Active" portion of the active state, as represented by the signal from the non-inverting output of latch 85 and shown in FIG. 2.

The "First Active" portion of the active state continues until counter 80 counts to a terminal value. In this embodiment, the terminal value occurs when the bit-eight output from counter 80 produces a rising edge. This rising edge causes one shot 93 to produce a pulse which signifies the occurrence of the timing window. The duration of the pulse generated by one shot 93 defines the duration of the timing window, which in the preferred embodiment is approximately 10 msec. Accordingly, the "Not Window" signal becomes active by exhibiting a low level (see FIG. 2.).

When identification apparatus 10 operates in the interrogation mode, AND gate 94 becomes enabled to produce a "Second signal" will be produced when AND gate 94 receives a pulse from pulse generator 96. In the preferred embodiment, pulse generator 96 may advantageously be constructed to produce approximately 105, 10 micro-second pulses per second. This pulse rate guarantees that one pulse will occur during the timing window. The "Second Trigger" signal output from AND gate 94 couples to OR gate 38 and laser 14 (see FIG. 4) to cause a second laser flash. The second laser flash will be detected and presented in the form of a second "Laser Detect" pulse through AND gate 88 and OR gate 90 to latch 85. Thus, the second laser flash causes latch 85 to toggle, or reset.

When latch 85 toggles, identification apparatus 10 enters a "Second Active" portion of the active state, as shown in FIG. 2. Apparatus 10 remains in the "Second Active" portion of the active state until an "EOS Reset" signal forces apparatus 10 into the inactive state. Throughout the "First Active" portion of the active state, counter 84 counted pulses generated by clock 76. However, during the "Second Active" portion of the active state, the measured time, or count, achieved by counter 84 at the time the second laser flash was detected, remains unchanged, or frozen, in counter 84 Thus, a digital number presented in the "Elapsed Time" signal represents the elapsed time between the first and second laser flashes.

Figure 7:
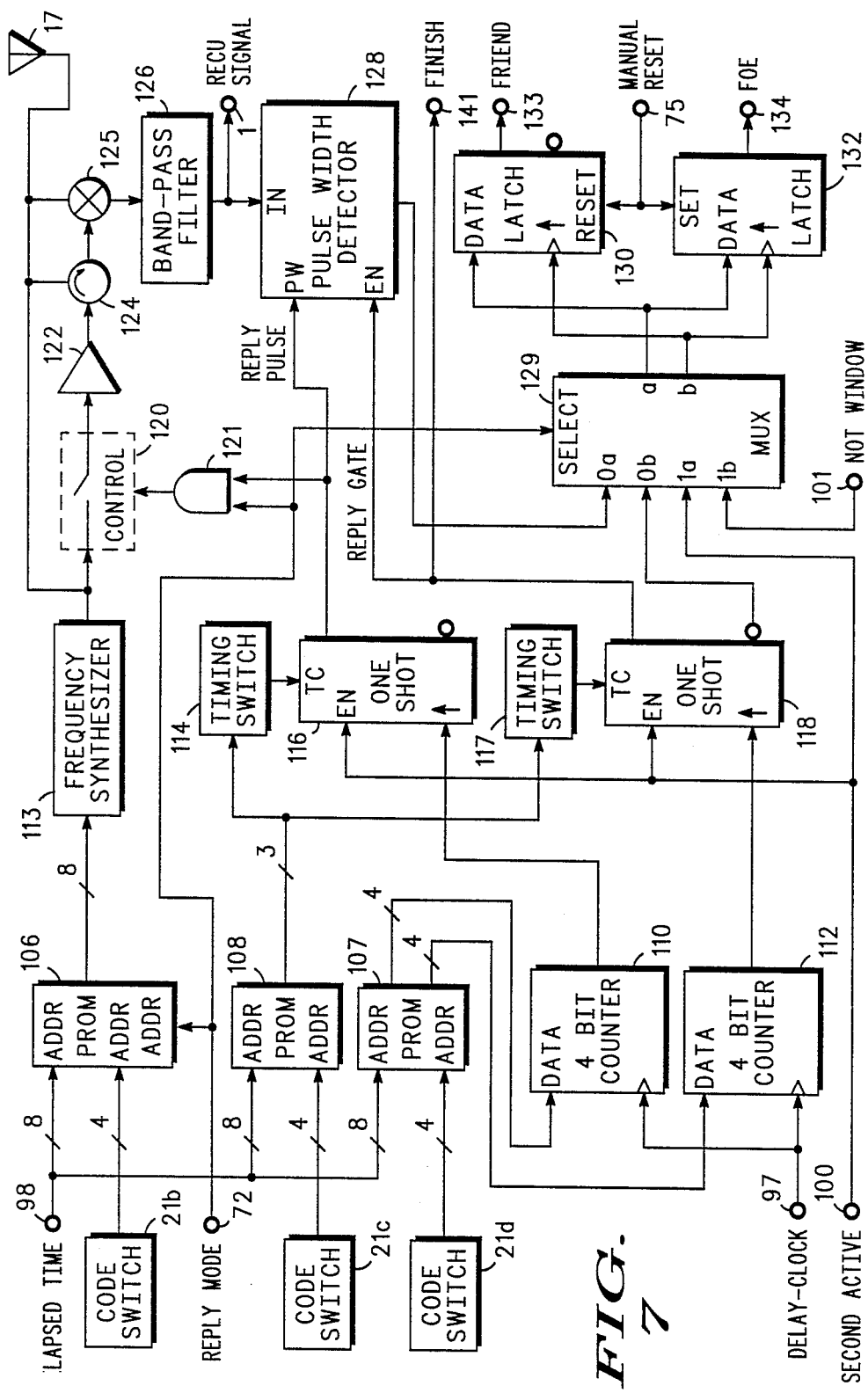
FIG. 7 shows a block diagram of a transmitter and receiver section of the first embodiment of the present invention.

In FIG. 7, a preferred embodiment of a transmitter and receiver section of identification apparatus 10 is shown. The "Elapsed Time" signal presented on terminal 98 connects to first portions of address inputs of PROM's 106, 108, and 109. Code switch 21b provides a four bit output which connects to a second portion of address inputs of PROM 106, code switch 21c provides a four bit output which connects to a second portion of address inputs of PROM 108, and code switch 21d provides a four bit output which connects to a second portion of address inputs of PROM 109.

PROM 106 provides an eight bit output which connects to a control input of frequency synthesizer 113. Frequency synthesizer 113 provides an oscillating signal at an output thereof whose frequency of oscillation is controlled by a digital number presented at its control input. The output of frequency synthesizer 113 connects to a first signal node of a switch 120 and to a first input of a mixer 125. A second signal node of switch 120 connects to an input of an amplifier 122, and an output of amplifier 122 connects to a first port of a circulator 124. A second port of circulator 124 connects to an antenna 17, and a third port of circulator 124 connects to a second input of mixer 125.

Reply mode terminal 72 connects to a third portion of address input of PROM 106, a first input of an AND gate 121, and a selection input of a multiplexer 129. An output of AND gate 121 connects to a control input of switch 120.

A first four bit output of PROM 109 connects to a data input of a counter 110, which is preferably a four bit counter. Additionally, a second four bit output from PROM 109 connects to a data input of a counter 112, also preferably a four bit counter Delay clock terminal 97 connects to clock inputs of both counter 110 and counter 112. An output from counter 110 connects to a rising-edge trigger input of a one shot 116, and an output from counter 112 connects to a rising-edge trigger of a one shot 118. The outputs from counters 110 and 112 represent terminal value outputs which provide a rising-edge when the counter reaches a terminal value, such as a carry or most significant bit output.

Second Active Terminal 100 connects to enable inputs of one shots 116 and 118 and to a 1−a input of multiplexer 129. A three bit output from PROM 108 connects to selection inputs of both a timing switch 114 and a timing switch 117. Outputs from timing switches 114 and 117 connect to timing control inputs of one shots 116 and 118, respectively. Timing switches 114 and 117 may advantageously represent analog multiplex switches which connect various resistances to the timing control inputs of one shots 116 and 118 under control of a three bit code supplied from PROM 108. Thus, PROM 108 and timing switches 114 and 117 define the duration of pulses produced by one shots 116 and 118.

A non-inverting output of one shot 116 connects to a second input of AND gate 121, and to a pulse width input of a pulse width detector 128. A non-inverting output of one shot 118 connects to an enable input of pulse width detector 128 and a terminal 141, labeled "Finish." An inverting output of one shot 118 connects to a 0−b input of multiplexer 129, and an output from pulse width detector 128 connects to a 0−a input of multiplexer 129. An output of mixer 125 connects to an input of a band pass filter 126, and an output of band pass filter 126 connects to a terminal 136, labeled "Recv Signal" and to a signal input of pulse width detector 128.

Pulse width detector 128 represents a comparison circuit which tests whether the pulse width of a signal received at the signal input and demodulated therein substantially equals the pulse width of a signal received at the pulse width input. The comparison occurs only while the signal received at the enable input remains active. The output represents a digital signal which indicates whether substantial similarity exists between the pulse width and signal input signals. Many different circuits can be designed by those skilled in the electronics design arts to accomplish this task.

Not Window terminal 101 connects to a 1−b input of multiplexer 129. An a output of multiplexer 129 connects to data inputs of latches 130 and 132, respectively. A b output of multiplexer 129 connects to clock inputs of latches 130 and 132, respectively. A non-inverting output of latch 130 connects to a terminal 133, labeled "Friend," and an inverting output of latch 132 connects to a terminal 134, labeled "Foe." Manual reset terminal 75 connects to reset inputs of latches 130 and 132.

The transmitter and receiver section of identification apparatus 10 shown in FIG. 7 operates in different manners depending on whether it acts in the reply or interrogate mode. When apparatus 10 operates in the reply mode, the signal presented on reply mode terminal 72 is high, and multiplexer 129 selects the 1−a and 1−b inputs to drive the data and clock inputs of latches 130 and 132. Thus, the "Not Window" signal acts as a clock which samples the state of the "Second Active" signal at the termination of the timing window in the reply mode (see FIG. 2). If a second laser flash was not received during the timing window, the "Second Active" signal remains at a low state and the inverting output of latch 132 changes to a high level. However, if a second laser flash was received during the timing window, the "Second Active" signal will exhibit a high level and the state of latch 130 will change to provide a high level at its non-inverting output. Friend and Foe terminals 133 and 134 couple to Friend and Foe lamps 25 and 29, respectively, of control panel 18 (see FIG. 3) to provide a humanly perceptible indication of the status of the interrogation.

When identification apparatus 10 operates in the reply mode and a properly timed second laser flash is detected, apparatus 10 proceeds to produce and transmit a radio frequency (RF) reply pulse signal. As discussed above, the elapsed time between first and second laser flashes is indicated in the "Elapsed Time" signal provided at terminal 98. This signal, along with a switch setting from code switch 21b and a bit indicating whether operation is in the reply or interrogation mode, form the address input to PROM 106. PROM 106 stores random number tables which are used in scrambling frequencies in the reply mode. If interrogation mode operation is specified, then qualifying random number tables are specified. A specified random number from a specified table defines a particular frequency at which synthesizer 113 oscillates.

A switch setting from code switch 21c and the "Elapsed Time" signal form the address input to PROM 108. PROM 108 stores several random number tables which control the pulse width of the reply pulse in the reply mode. Additionally, a switch setting from code switch 21d and the "Elapsed Time" signal form the address input to PROM 109, which stores random number tables used with counter 110 to control the transmission delay time between the second laser pulse and transmission of the reply pulse in the reply mode. In the reply mode, one shot 116 provides a "Reply Pulse" signal (see FIG. 2) which passes through AND gate 121 to close switch 120. When switch 120 closes, the synthesizer output signal passes through amplifier 122, circulator 124 and is transmitted at antenna 17.

In the interrogation mode, one shot 116 provides a "Reply Pulse" signal (see FIG. 2), which pulse width detector 128 compares against a received signal. The received signal enters antenna 17 and passes through circulator 124 to mixer 125. Since synthesizer 113 also outputs a signal to mixer 125, synthesizer 113 serves as a local oscillator in the interrogation mode. Mixer 125 down-converts the received signal to an expected target frequency which is passed through band pass filter 126. If an improper frequency signal is received, then band pass filter 126 blocks passage of the down-converted signal.

As discussed above in connection with FIG. 3, an audio signal may be provided to indicate the results of an interrogation. In such an embodiment, synthesizer 113 and band pass filter 126 may advantageously cause an expected target "Recv Signal" at terminal 136 to oscillate at a frequency within the range of audio frequencies. Thus, Recv Signal terminal 136 may couple through an amplifier and audio mixing circuitry (not shown) to audio output 26 shown in FIG. 3.

The "Reply Gate" signal supplied by one shot 118, relates to the "Reply Pulse" signal produced by one shot 116. The "Reply Gate" signal represents a pulse which goes active prior to the activation of the "Reply Pulse" signal and remains active for a longer duration then the "Reply Pulse" signal (see FIG. 2). The occurrence and duration of the "Reply Gate" signal is controlled from PROM's 109 and 108, respectively, through counter 112 and timing switch 117, respectively.

The "Reply Gate" signal is useful when identification apparatus 10 operates in the interrogation mode. The reply gate signal forces pulse width detector 128 to test the occurrence and pulse width of the "Recv Signal" only when the "Reply Gate" signal is active.

Additionally, the end of the "Reply Gate" pulse indicates the end of the interrogation process. Thus, in the interrogation mode an inverted "Reply Gate" pulse serves as a clock input to latches 130 and 132 which sample the output signal produced by pulse width detector 128. Either friend lamp 25 or foe lamp 24 illuminates depending on the state of the signal output from pulse width detector 128 at the end of the "Reply Gate" signal in the interrogation mode. The illuminated one of friend lamp 25 and foe lamp 24 remains illuminated until the "Manual Reset" signal produced from manual reset switch 29 activates (see FIG. 3).

Referring to FIG. 8, a reset section of the preferred embodiment is shown. In FIG. 8, Foe terminal 134 connects to a rising-edge trigger input of a one shot 142. A non-inverting output of one shot 142 connects to a first input of a NOR gate 144. Finish terminal 141 connects to a second input of NOR gate 144, and an output from NOR gate 144 connects to a rising-edge trigger of a one shot 145. A non-inverting output of one shot 145 connects to EOS Reset terminal 69.

One shots 142 and 144 produce short duration pulses, such as 1.0 microsecond pulses. Thus, when identification apparatus 10 causes foe lamp 24 (see FIG. 3) to illuminate or ends a reply or interrogation sequence, the "EOS Reset" signal is generated (see FIG. 2). As described above, the "EOS Reset" signal causes apparatus 10 to enter the inactive state and initializes counters and latches which measure elapsed time and indicate particular states within a reply or interrogation sequence.

FIG. 9 shows a particular embodiment of high pass filter 52 and pulse stretcher 53, as described above in connection with FIG. 5. The input of high pass filter 52 represents a first node of a capacitor 146. A second node of capacitor 146 represents the output of high pass filter 52. Additionally, a resistor 149 connects between the second node of capacitor 146 and ground terminal 66.

Pulse stretcher 53 has an NPN transistor 150, which serves as an amplifier and has a base node that represents the input to pulse stretcher 53. A collector node of transistor 150 connects to positive potential terminal 65. An emitter node of transistor 150 connects to a first node of a resistor 152, an anode node of a diode 153, and an inverting input of a comparator 158. A cathode node of diode 153 connects to a first node of a resistor 154 and an anode node of a diode 156. A cathode node of diode 156 connects to a non-inverting input of comparator 158 and to a first node of a capacitor 157. Second nodes of resistor 152 and capacitor 157 connect to ground terminal 66. A second node of resistor 154 connects to a terminal 67 which is adapted to receive an negative potential. An output of comparator 158 connects to a rising-edge trigger of a one shot 160, and a non-inverting output of one shot 160 serves as the output of pulse stretcher 53.

High pass filter 52 produces a short pulse or spike when energized with a signal having a relatively fast rise time. Those skilled in the electronics circuit design arts can design high pass filter 52 to pass signals responsive to laser flashes which may exhibit transition times of approximately 1 nanosecond, but substantially block signals having slower transition times, such as transition times of 1 millisecond or slower.

The pulse passed by high pass filter 52 causes transistor 150 to switch ON and charge capacitor 157 through diodes 153 and 156 operating in a forward biased mode. At this point in time, the inverting input of comparator 158 remains at a greater potential than the non-inverting input and no trigger signal is provided to one shot 160.

After the pulse disappears from the output of high pass filter 52, transistor 150 turns OFF. The inverting input of comparator 158 goes to an approximate ground potential through the operation of resistor 152. However, the non-inverting input of comparator 158 remains at a relatively high potential due to a charge stored in capacitor 157. Therefore, the signal output from comparator 158 changes state causing one shot 160 to produce a pulse. One shot 160 may advantageously be configured in a non-retriggerable mode to produce a pulse of sufficient duration to operate identification apparatus 10 as described above, such as an 1.0 microsecond pulse. The non-inverting input of comparator 158 remains at a greater potential than the inverting input until capacitor 157 discharges through diode 156, which has now become reverse biased, and the non-inverting input of comparator 158.

The foregoing description uses a particular embodiment to illustrate the present invention. However, those skilled in the art will recognize that changes and modifications may be made in this embodiment without departing from the scope of the present invention. For example, certain analog devices described herein may be replaced with digital devices, such as replacing the one shots described herein with counters. Additionally, the preferred embodiment described herein operates exclusively in either the interrogate or reply modes. However, in order to permit simultaneous interrogation and reply, various sections of the present invention could be duplicated in a manner those skilled in the art can accomplish with the teaching provided herein. Those skilled in the art will also recognize that the gates described herein could be replaced with logical equivalents that the polarities and absolute timing considerations suggested herein are subject to change, and that many alternate techniques could be utilized to synchronize several ones of identification apparatuses 10 together.

Additionally, those skilled in the art will recognize that the description provided herein is presented only to teach the present invention. Other circuitry may be needed to ensure that clock signals remain free from spurious noise pulses, to improve reliability in sensitive portions of apparatus 10, such as in connection with counter 77 (see FIG. 6), and to cure potential race conditions which may be suggested in the block diagrams presented herein. These and other modifications obvious to those skilled in the art are intended to be included within the scope of the present invention.

I claim:

1. A battlefield identification system comprising:

an interrogator including laser transmission means for producing convergent coded interrogation pulses during a random time period to selectively interrogate one target of a plurality of targets and said interrogator receiver means for receiving a reply signal;

the interrogating pulses of said interrogator being aimed in a predetermined direction;

means, coupled to said laser transmission means, for randomizing a period of time between a first one of the interrogation pulses and a second one of the interrogation pulses;

a target including diode detector means for detecting said interrogation pulses, said diode detector means being located periodically about said target of detecting the interrogation pulses produced by the laser transmission means of said interrogator;

means, coupled to said diode detector means of said target, for measuring said random time period between successive interrogation pulses of said laser transmission means of said interrogator;

first memory means coupled to said means for measuring, said first memory means operating to produce predetermined random numbers, for controlling the frequency, pulse width and transmission delay parameters of said reply signal;

transmitter means coupled to said measuring means and to said first memory means, said transmitter means being for transmitting said reply signal so that the reply signal exhibits said frequency, pulse width and transmission delay parameters determined by said random time period between said successive interrogation pulses and by said random numbers;

said receiver means operating to receive said reply signal from said transmitter means;

second memory means operating to produce said predetermined random numbers for controlling said frequency, pulse width and transmission delay parameters of said reply signal;

qualifier means, coupled to said receiver means and to said second memory means, for generating an expected frequency, pulse width and transmission delay parameters of said reply signal; and means, coupled to said qualified means, for indicating whether said reply signal conforms to said expected frequency, pulse width and transmission delay.

2. A battlefield identification system as claimed in claim 1 additionally comprising an interrogation indicator coupled to the detector of said target for providing an indication, perceptible by human beings, of the detection of an interrogation pulse and of a direction from which an interrogation pulse originates.

3. A battlefield identification system as claimed in claim 1 wherein:
said transmitter means transmits said reply signal so that a value for a second one of frequency, pulse width, and transmission delay parameters is determined in response to said random time period;
said qualifier means specifies an expected value for the second one of said frequency, pulse width, and transmission delay; and
said means for indicating indicates whether the first and second ones of the frequency, pulse width, and transmission delay parameters exhibited the expected value.

4. A battlefield identification system as claimed in claim 3 wherein:
said transmitter means transmits said reply signal so that a value for a third one of frequency, pulse width, and transmission delay parameters is determined in response to the elapsed time;
said qualifier means specifies an expected value for the third one of the frequency, pulse width, and transmission delay parameters; and
said means for indicating indicates whether the first, second and third ones of the frequency, pulse width, and transmission delay parameters exhibited the expected value.

5. A battle field identification system as claimed in claim 1 additionally comprising means, coupled to said transmitter means, for scrambling the frequency, pulse width and transmission delay parameters relative to said random time period between successive interrogation pulses.

6. A battlefield identification system as claimed in claim 8 additionally comprising:
first timing window generator means coupled to said laser transmission means said first window generator means enabling the occurrence of the second one of the interrogation pulses only within a window of time, the window of time varying a predetermined manner; and
second timing window generator means coupled to said measuring means and to said transmitter means, both of said target, and belting synchronized with said first timing window generator means, said second window generator means permitting the transmission of the reply signal only when a second one of the interrogation pulses occurs within the window of time.

7. A battlefield identification system as claimed in claim 1 wherein
said receiver means of said interrogator comprises an antenna, said antenna being directionally sensitive in the predetermined direction.

8. A battlefield identification system as claimed in claim 1, said diode detector means for providing an electrical pulse indicative of the occurrence of a laser flash exhibiting a transition time and a flash duration, said diode detector means comprising:
a photo sensitive diode;
a high pass filter coupled to said diode and configured to pass signals exhibiting transition times substantially equivalent to the transition time of the laser flash; and
a pulse stretcher coupled to said filter, said pulse stretcher being responsive to signals passed by said filter and providing a pulse having a duration greater than the laser flash duration.

9. A battlefield identification system as claimed in claim 8 said diode detector means additionally comprising:
an additional photo sensitive diode arranged in cooperation with said photo sensitive diode so that one of said photo sensitive diode and said additional photo sensitive diode receives the laser flash;
an additional high pass filter coupled to said additional photo sensitive diode;
an additional pulse stretcher coupled to said additional high pass filter; and
a logical OR device having a first input coupled to said pulse stretcher, a second input coupled to said additional pulse stretcher, and an output for providing the electrical pulse of the laser detector.

10. A battlefield identification system as claimed in claim 8 wherein said high pass filter is configured to substantially pass signals exhibiting one nanosecond transition times and to substantially block passage of signals exhibiting greater than 1 millisecond transition time.

11. A battlefield identification system as claimed in claim 8 wherein said pulse stretcher comprises:
an amplifier having an input coupled to said filter and an output;
a capacitor coupled to the output of said amplifier so that said capacitor charges in response to a signal passed by said filter and operation of said amplifier; and
a comparator having first and second inputs, said comparator first input being coupled to said amplifier and said comparator second input being coupled to said capacitor, said comparator being for detecting the charging of said capacitor.

12. A battlefield examination apparatus for use in an identification system, said examination apparatus comprising:
transmitter mean capable of producing two convergent coded interrogation pulses separated by random elapsed time to selectively interrogate one target of a plurality of targets;
the interrogation pulses of said transmitter means being aimed in a predetermined direction;
qualifier means coupled to said transmitter means, said qualifier means being for specifying an expected valued for a frequency, pulse width and transmission delay parameters of a reply signal, the expected value being related to the random elapsed time between the two interrogation pulses;
receiver means coupled to said qualifier means, said receiver means being for receiving the reply signal; and
means, coupled to said qualifier means, for indicating whether the received reply signal exhibited the expected frequency, pulse width and transmission delay parameters;
switch means coupled to said qualifier means, said switch means being for selecting a particular one of a plurality of substantially random number tables to be used in determining the expected frequency, pulse with and transmission delay parameters;

means, coupled to said transmitter means, for randomizing the elapsed period of time between the two interrogation pulses; and timing, winding generator means coupled to said transmitter means, said timing window generator means enabling the occurrence of the second one of the two interrogation pulses only within a window of time, the window of time varying a predetermined manner.

13. A battlefield examination apparatus as claimed in claim 12 wherein said receiver means comprising radio frequency means including an antenna, said antenna being directionally sensitive in the predetermined direction.

14. A battle field reply apparatus for use in an identification system, said reply apparatus comprising:

detector means for detecting convergent coded interrogation pulses, detector means including diode detector means for detecting said interrogation pulses, said diode detector means being located periodically about said target;

means, coupled to said diode detector means, for measuring an elapsed time between successive interrogation pulses detected by said diode detector means; and transmitter means coupled to said measuring means, said transmitter means being for transmitting a reply signal so that the reply signal exhibit parameters whose values are determined by the elapsed time between successive interrogation pulses detected by said detector;

interrogation indicator means coupled to said diode detector means, sand interrogation indicator being for providing an indication, perceptile by human beings, of the detection of an interrogation pulse;

means coupled to said transmitter means, for scrambling the frequency, pulse width and transmission delay values relative to the random elapsed time between successive interrogation pulses detected by said detector means;

switch means coupled to said scrambling means, said switch means being for selecting a particular one of a plurality of substantially random number tables to be used by said scrambling means; and timing window generator means coupled to said measuring means and to said transmitter means, said timing window generator means being for generating a predetermined window of time so that the transmission of the reply signal is permitted only when a second one of the two interrogation pulses occurs within the window of time.

15. A battlefield reply apparatus as claimed in claim 14 wherein said interrogation indicator means provides an indication of a direction from which an interrogation pulse originated.

16. A battlefield reply apparatus as claimed in claim 14 wherein said transmitter means transmits the reply signal so that said parameters include first values of frequency, pulse width, and transmission delay which are determined in response to the random elapsed time.

17. A method of battlefield identification system comprising the steps of:

producing two convergent coded interrogation pulses with an interrogator, the two interrogation pulses being separated by a substantially random time interval, and the interrogation pulses being selectively aimed at one target of a plurality of targets;

detecting the two interrogation pulses of said producing step in the target;

measuring the random time between the two interrogation pulses at the interrogator and at the target;

first programming, at the target, a value for a first one of frequency, pulse width, and transmission delay parameters of a reply signal in response to the time measured in said measuring step;

transmitting, from the target, the reply signal of said first programming step;

receiving, at the interrogator, the reply signal transmitted in said transmitting step;

second programming, at the interrogator, a plurality of values of said frequency, pulse width and transmission delay parameters of an expected reply signal;

selecting said first one of said frequency, pulse width and transmission delay parameters corresponding to said expected values of said frequency pulse width and transmission delay parameters; and comparing at the interrogator, said expected values for the parameters of a frequency, pulse width and transmission delay with the values for the frequency, pulse width and transmission delay parameters of the reply signal received in said receiving step;

said first programming step additionally comprising the step of specifying a value for a second one of frequency, pulse width, and transmission delay parameters in response to the time measured in said measuring steps; and said comparing step compares expected values for the first and second parameters of said first programming step with values for the first and second parameter of the reply signal received in said receiving step.

18. A method as claimed in claim 17 wherein:

said first programming step additionally comprises the step of scrambling the programmed value relative to the time measured in said measuring step; and said comparing step additionally comprises the step of qualifying the expected value to compensate for said scrambling of said first programming step.

19. A method as claimed in claim 18 wherein:

said scrambling and qualifying steps each utilize a plurality of predetermined random number tables; and the method additionally comprises the step of specifying a particular one of the plurality of random number tables for use by each of said scrambling and qualifying steps.

20. A method as claimed in claim 17 wherein said producing step comprises the step of randomly generating an interval between the two interrogation pulses so that a later occurring one of the two interrogation pulses occurs within a timing window, the occurrence of the timing window being predetermined in accordance with a sequence defined in a particular one of a plurality of random number tables.

* * * * *

UNITED STATES PATENT AND TRADEMARK OFFICE
CERTIFICATE OF CORRECTION

PATENT NO. : 4,837,575

DATED : June 6, 1989

INVENTOR(S) : Leo B. Conner, Jr.

It is certified that error appears in the above-identified patent and that said Letters Patent is hereby corrected as shown below:

In column 18, claim 1, line 27, before the word "receiver" insert --including--.

In column 18, claim 1, line 29, the word "interrogating" should be changed to --interrogation--.

In column 19, claim 5, line 35, the words "battle field" should be changed to one word --battlefield--.

In column 19, claim 6, line 42, the numeral "8" should be changed to --5--.

In column 19, claim 6, line 51, the word "belting" should be --being--.

In column 20, claim 11, line 40, after the word "amplifier" insert --output--.

Signed and Sealed this

Fifth Day of June, 1990

Attest:

HARRY F. MANBECK, JR.

*Attesting Officer*     *Commissioner of Patents and Trademarks*